US012806814B2

(12) United States Patent
Carnes et al.

(10) Patent No.: US 12,806,814 B2
(45) Date of Patent: Nov. 24, 2026

(54) ROTARY CUTTING SYSTEM, DIE BOARD AND SCRAP EJECTOR FOR SAME, AND METHODS OF ASSEMBLY

(71) Applicant: Alliance Packaging, LLC, Renton, WA (US)

(72) Inventors: Dina Carnes, Puyallup, WA (US); Curtis Mattson, Kent, WA (US)

(73) Assignee: Alliance Packaging, LLC, Renton, WA (US)

( * ) Notice: Subject to any disclaimer, the term of this patent is extended or adjusted under 35 U.S.C. 154(b) by 314 days.

(21) Appl. No.: 18/522,055

(22) Filed: Nov. 28, 2023

(65) Prior Publication Data

US 2024/0173882 A1 May 30, 2024

Related U.S. Application Data

(60) Provisional application No. 63/429,058, filed on Nov. 30, 2022.

(51) Int. Cl.
*B26D 7/18* (2006.01)
*B26F 1/38* (2006.01)

(52) U.S. Cl.
CPC ............ *B26D 7/1818* (2013.01); *B26F 1/384* (2013.01)

(58) Field of Classification Search
CPC .......... B26D 7/1818; B26D 7/18; B26D 7/26; B26D 2007/189; B26D 2007/2607; B26F 1/44; B26F 1/384; B26F 2001/4463
USPC ............................................ 83/111, 658–659
See application file for complete search history.

(56) References Cited

U.S. PATENT DOCUMENTS

| | | | | |
|---|---|---|---|---|
| 3,752,042 | A * | 8/1973 | Castille | B26D 7/2628 83/696 |
| 4,020,724 | A | 5/1977 | Quinlan | |
| 5,875,699 | A | 3/1999 | Koelsch | |
| 8,726,775 | B2 | 5/2014 | Yamada et al. | |
| 2012/0285306 | A1 | 11/2012 | Weibelt | |

FOREIGN PATENT DOCUMENTS

| | | | | |
|---|---|---|---|---|
| WO | WO-2011016374 A1 * | 2/2011 | | B26F 1/384 |
| WO | WO-2019005781 A1 * | 1/2019 | | B26D 7/1818 |

OTHER PUBLICATIONS

International Search Report and Written Opinion for PCT/US2023/081424, mailed Sep. 23, 2024, 37 pages.

* cited by examiner

*Primary Examiner* — Nhat Chieu Q Do
(74) *Attorney, Agent, or Firm* — Cozen O'Connor

(57) ABSTRACT

A rotary cutting system includes a die board including a substrate and a scrap ejector. The die board includes at least one oblong fastener receiving hole that receives a fastener to couple the die board to a die drum. The oblong shape of the fastener enables movement of the die board relative to the die drum after insertion of a plunger through a hole in the scrap ejector and into the die drum while the fastener remains within the oblong fastener receiving hole and an aligned recess of the die drum. The die board is rotatable such that the hole in the scrap ejector is no longer aligned with the plunger, preventing the plunger from exiting the die drum through the hole.

18 Claims, 10 Drawing Sheets

ROTARY CUTTING SYSTEM, DIE BOARD AND SCRAP EJECTOR FOR SAME, AND METHODS OF ASSEMBLY

CROSS REFERENCE TO RELATED APPLICATION

This application claims the benefit of Provisional Application No. 63/429,058, filed Nov. 30, 2022, which is incorporated by reference herein.

BACKGROUND

Technical Field

This disclosure relates generally to rotary cutting systems that form corrugated packaging blanks, components associated with forming features within the corrugated packaging blanks, and methods of assembling the rotary cutting systems and associated components of such systems.

Description of the Related Art

Rotary cutting systems are used to remove portions of corrugated packaging blanks (e.g., to form a handle) during a manufacturing process. The removed portions are typically referred to as scrap or trim. The portions are removed prior to other assembly steps (e.g., folding) of the corrugated packaging blank into a container. Once the portion (scrap) is removed, the remainder of the corrugated packaging blank may be referred to as a container in a flat/unerected form. The container is typically folded into an erect container after removal from the rotatory cutting system.

Known rotatory cutting systems include a pair of rollers including a die drum that rotates about an axis in one rotational direction, and an anvil drum that rotates about another axis in another rotational direction that is opposite the rotational direction of the die drum. The die drum typically includes a plurality of tapped holes to facilitate mounting of one or more die plates/boards to the die drum. The die drum and the anvil drum rotate in opposite directions so that an object (e.g., a corrugated packaging blank) interposed at a nip (point/region of contact) between the die drum and the anvil drum will be grabbed and translated there-between.

Known die boards include blades, typically made of steel rule, that at least partially separate a portion of the corrugated packaging blank from a remainder of the corrugated packaging blank as the corrugated packaging blank passes between the die drum and the anvil drum. The cutting blade(s) may each form a cutout area, typically an enclosed shape, such that when the cutting blade(s) contact the corrugated packaging blank a portion of the corrugated packaging blank that is the same shape as the cutout area is separated from the remainder.

This separated portion of the corrugated packaging blank may become lodged in the blade as the corrugated packaging blank passes between the die drum and the anvil drum. If the separated portion of the corrugated packaging blank is not removed from within the enclosed shape formed by the blade, the blade may fail to separate portions of respective corrugated packaging blanks during subsequent rotations of the die drum. Additionally, the cutting blades may be damaged and/or separated from the substrate of the die board to which the cutting blade is secured as a result of continued packing of scrap into the enclosed shape during subsequent rotations.

Known die boards include scrap ejectors that remove the separated portion of the corrugated packaging blank from the enclosed shape formed by the blade. Some known scrap ejectors include a resilient member (e.g., rubber, cork, some other rebounding/resilient material or dense material). The resilient member may be positioned inside the enclosed shape formed by the blade such that as the portion of the corrugated packaging blank is separated from the remainder, the portion compresses the resilient member. Once the blade progresses along its rotation until the blade is no longer facing the anvil drum, the resilient member expands/returns to its neutral state, and in doing so the resilient member pushes the separated portion of the corrugated packaging blank out of the enclosed shape and free from contact with the blade.

One problem that arises from the use of a resilient member as the scrap ejector (referred to herein as a "passive" scrap ejector) is that the scrap (i.e., separated portion of the corrugated packaging blank) is ejected "up" (i.e., outward, radially away from the axis of rotation of the die drum to which the die board is secured) into the travelling remainder of the corrugated packaging blank and may be carried toward other components of the rotary cutting system where the scrap may cause jams or other malfunctions. Another undesired outcome that may result from the upward, outward ejection of the scrap is "merging" of the scrap with the remainder of the corrugated packaging blank resulting in a "contaminated" or unsatisfactory finished product.

To overcome this problem, scrap ejectors with a controllable activation were developed. Controllable scrap ejectors (also referred to herein as "active" scrap ejectors) enable rotary cutting systems with a die drum positioned below an anvil drum. These active scrap ejectors may include a plunger. The plunger is controllable (i.e., movable when located within a desired portion of a rotation of the die drum about its axis of rotation. Some known active scrap ejectors include a lever (e.g., in the form of a plate or plate-like member) that is secured to the die board such that the plate is rotatable relative to the die board about an axis of rotation while all other relative movement between the plate and the die board is prevented.

Plunger receiving holes within a die drum are in fixed positions, and if a plunger receiving hole is not in a position that is aligned with the enclosed shape of the blade, the lever may be provided so as to "reach" into the enclosed shape of the blade. Activation of the plunger positioned "below" the plate (e.g., within the die drum) causes the plunger to strike the lever, thereby moving the lever, including a portion of the lever positioned within the enclosed shape.

Once the plunger reaches a position along its rotation (e.g., if the nip is at 0° along the path of rotation), the position may be when the plunger is between 90° (e.g., perpendicular to the direction of gravity) and 180° (parallel to the direction of gravity) the plunger is activated (i.e., translates away from the axis of rotation of the die drum and toward the plate). The plunger may be activated by a cam positioned within the die drum. Once activated, the plunger moves into contact with the lever and rotates the lever about the axis of rotation of the active scrap ejector.

The rotation of the lever causes a portion of the plate (e.g., one or more raised or flat extensions positioned within the enclosed shape of the cutout area) to push out the separated portion of the corrugated packaging blank from within the enclosed shape of the blade. Because the activation position of the plunger points "downward" away from the remainder of the corrugated packaging blank, ejection of the scrap into the rotary cutting system or the remainder of the corrugated packaging blank may be avoided.

Assembly of these known systems, specifically positioning the plunger relative to the plate, is complicated as it includes the use of small, removable parts. Additionally, some rotatory cutting systems include multiple die boards and/or multiple scrap ejectors secured to each respective die board. As the number of scrap ejectors increases, the set up time for each of the plunger/scrap ejector combinations increases significantly.

BRIEF SUMMARY

The present disclosure provides an improved rotary cutting system that cuts an object, such as a corrugated packaging blank, when passed between a rotating die drum and an anvil drum that rotates in a direction opposite that of the die drum. The object may be flat (e.g., with a thickness that is less than both a width and a length), planar, curved, or any other shape that passes between the oppositely rotating die drum and anvil drum.

According to one embodiment, a method of assembling a rotary cutting system includes aligning a first through hole of a die board with a first anchor point of a die drum, wherein the die drum is rotatable about an axis of rotation in a first rotational direction, and the first through hole of the die board has an oblong shape that is elongate along the first rotational direction. The method further includes aligning a through hole of a scrap ejector supported by the die board with a recess of the die drum, and aligning a second through hole of the die board with the recess of the die drum. The method further includes inserting a portion of a fastener through the first through hole and into the first anchor point such that the fastener is secured relative to the die drum, inserting a plunger through the through hole of the scrap ejector, through the second through hole of the die board, and into the recess, and rotating the die board and the scrap ejector relative to the die drum and the plunger until the through hole of the scrap ejector is out of alignment with the plunger such that the plunger's exit from the recess is blocked by the scrap ejector.

Additional embodiments described herein provide a method of assembling a die board, the method including positioning a lever within a cutout of a substrate, the cutout including an opening in a convex surface of the substrate, and the cutout extending towards a concave surface of the substrate that is opposite the convex surface. The method further including securing the lever within the cutout such that the lever is rotatable relative to the substrate about an axis of rotation, and such that the axis of rotation is positioned within the cutout and between the convex surface and the concave surface.

Additional embodiments described herein provide a die board including a substrate and a lever. The substrate includes a first major surface having a convex shape, a second major surface, opposite the first major surface, the second major surface having a concave shape, a base surface positioned between the first major surface and the second major surface, the base surface opposite the second major surface; and a cutout extending from an opening in the first major surface toward the second major surface such that the cutout terminates at the base surface. The lever is supported by the substrate such that relative movement of the lever and the substrate is prevented in all degrees of freedom other than rotation about an axis of rotation that is between the first major surface and the second major surface.

Additional embodiments described herein provide a scrap ejector that includes a lever, a shaft secured to the lever such that relative movement between the lever and the shaft is prevented, a bearing block having a recess, wherein the shaft is positioned within the recess such that the shaft is rotatable relative to the bearing block about an axis of rotation, a biasing member positioned such that the biasing member exerts a biasing force on the lever, and a bracket having at least one through hole. The shaft is positioned in the recess, the bearing block is positioned within a cutout of a substrate, the cutout extends through an opening in a convex surface of the substrate and towards a concave surface of the substrate, and at least one fastener is inserted through the at least one through hole and into the convex surface when the bracket is positioned so as to block a portion of the opening such that movement of the bearing block out of the cutout through the opening is prevented.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not necessarily drawn to scale, and some of these elements may be arbitrarily enlarged and positioned to improve drawing legibility. Further, the particular shapes of the elements as drawn, are not necessarily intended to convey any information regarding the actual shape of the particular elements, and may have been solely selected for ease of recognition in the drawings.

DETAILED DESCRIPTION

Figure 2:
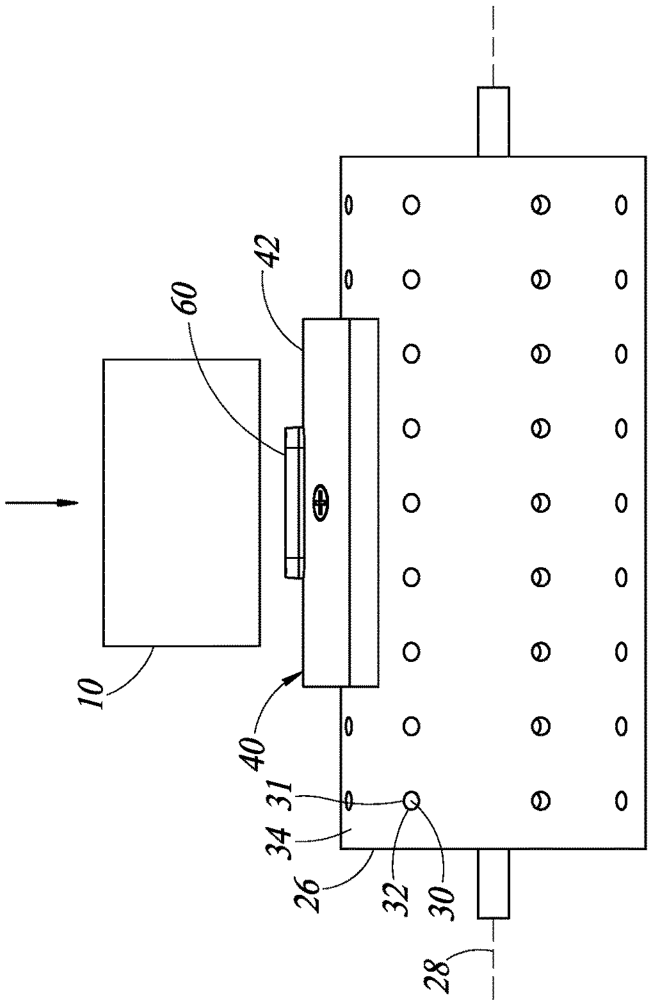
FIG. 2 is a top plan view of the rotary cutting system illustrated in FIG. 1, the system in the first orientation.

In the following description, certain specific details are set forth to provide a thorough understanding of various disclosed embodiments. However, one of ordinary skill in the relevant art will recognize that embodiments may be practiced without one or more of these specific details, or with other methods, components, materials, etc. In other instances, well-known structures associated with rotary cutting systems have not been shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense, that is as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments. For example, certain features of the disclosure which are described herein in the context of separate embodiments may also be provided in combination in a single embodiment. Conversely, various features of the disclosure that are described in the context of a single embodiment may also be provided separately or in any subcombination.

As used in this specification and the appended claims, the singular forms "a," "an," and "the" include plural referents unless the content clearly dictates otherwise. It should also be noted that the term "or" is generally employed in its broadest sense, that is as meaning "and/or" unless the content clearly dictates otherwise. Reference herein to two elements "facing" or "facing toward" each other indicates that a straight line can be drawn from one of the elements to the other of the elements without contacting an intervening solid structure.

The term "aligned" as used herein in reference to two elements along a direction means a straight line that passes through one of the elements and that is parallel to the direction will also pass through the other of the two elements. The term "between" as used herein in reference to a first element being between a second element and a third element with respect to a direction means that the first element is closer to the second element as measured along the direction than the third element is to the second element as measured along the direction. The term "between" includes, but does not require that the first, second, and third elements be aligned along the direction.

Recitation of ranges of values herein are merely intended to serve as a shorthand method of referring individually to each separate value falling within the range including the stated ends of the range, unless otherwise indicated herein, and each separate value is incorporated into the specification as if it were individually recited herein.

Aspects of the disclosure will now be described in detail with reference to the drawings, wherein like reference numbers refer to like elements throughout, unless specified otherwise. Certain terminology is used in the following description for convenience only and is not limiting. The term "plurality," as used herein, means more than one. The term "at least a portion" of a structure includes the entirety of the structure.

The headings and Abstract of the Disclosure provided herein are for convenience only and do not interpret the scope or meaning of the embodiments.

Referring to FIGS. 1 to 6, a rotary cutting system 20 includes a die drum 22 and an anvil drum 24. The die drum 22 may include a die drum body 26 (e.g., an elongated cylinder) that is rotatable about an axis of rotation 28 in a first rotational direction R1. According to one embodiment, the die drum 22 may be elongate along the axis of rotation 28. The die drum 22 may include a plurality of recesses 30 that extend into the die drum body 26 from an opening 32 in an outer surface 34 of the die drum body 26. According to one embodiment, the recesses 30 may include anchor points 31 (e.g., in the form of through holes that extend through an entirety of the thickness of the die drum body 26, blind holes that terminate within the die drum body 26, or a combination of both through holes and blind holes). For example, one or more of the anchor points 31 may be in the form of a bolt hole.

According to one embodiment, the plurality of recesses 30 may be arranged in rows (e.g., each row extending along a direction parallel to the axis of rotation 28) such that holes within each row are equidistantly spaced from adjacent ones of the plurality of recesses 30 with the same row. Each of the rows may be equidistantly spaced from adjacent rows circumferentially about the outer surface 34 of the die drum 22 (e.g., along the first rotational direction R1 of the die drum 22). Thus, the plurality of recesses 30 may be arranged in a grid as shown in the illustrated embodiment. Alternatively, the plurality of recesses 30 may have other arrangements (either regular or irregular) to accommodate the needs of a specific operation in which the rotary cutting system 20 is being used. For example, the plurality of recesses 30 within a row may be uniformly arranged, while the rows are positioned with varying distances between them (or vice versa).

The plurality of recesses 30 may be arranged to each accept a fastener to secure components (e.g., a die board) to the die drum 22. According to one embodiment, at least some of the plurality of recesses 30 (e.g., at least some, up to all, of the anchor points 31) may be at least partially tapped so as to correspond to external threads of a fastener (e.g., bolt).

The anvil drum 24 may include an anvil drum body 36 (e.g., an elongated cylinder) that is rotatable about an axis of rotation 38 in a second rotational direction R2. According to one embodiment, the anvil drum 24 may be elongate along the axis of rotation 38. During operation of the rotary cutting system 20 the first rotational direction R1 may be in the opposite direction of the second rotational direction R2. Additionally, the die drum 22 and the anvil drum 24 may be rotated at the same angular speed.

The rotary cutting system 20 may include a die board 40 having a substrate 42. According to one embodiment, the substrate 42 is made of wood. The substrate 42 may include a first major surface 44 that is convex and a second major surface 46 that is concave. The second major surface 46 may be shaped so as to correspond to the outer surface 34 of the die drum 22. According to one embodiment, the second major surface 46 forms a portion of a cylinder that has a diameter approximately equal to (e.g., equal to within tolerances) a diameter of the outer surface 34.

The die board 40 may include a plurality of through holes. At least some of the plurality of through holes may be fastener receiving holes 48 that receive a fastener to secure the die board 40 to the die drum 22. The plurality of through holes of the die board 40 may further include holes 50 that are sized to facilitate a user carrying the die board 40 (i.e., holes that are non-functional during operation of the rotary cutting system 20). The through holes of the die board 40 may include holes that receive other components (e.g., a plunger as will be described in detail below) of the rotary cutting system 20 besides those that secure the die board 40 to the die drum 22 (i.e., fasteners).

The rotary cutting system 20 may include a blade 60 carried by the die board 40 such that an edge of the blade 60 extends away from (e.g., radially) the first major surface 44. The blade 60 may form a perimeter of a closed shape (e.g., an oval, a slot, etc.) as shown. The blade 60 may include an interior volume within closed shape.

The rotary cutting system 20 (e.g., the die board 40) may include a scrap ejector 62. The scrap ejector 62 may include a lever 64, and the scrap ejector 62 may be carried by the substrate 42 such that lever 64 is rotatable relative to the substrate 42 about one axis of rotation, while all other relative movement is prevented. As shown, the lever 64 may be in the form of a plate or plate-like member.

Figure 1:
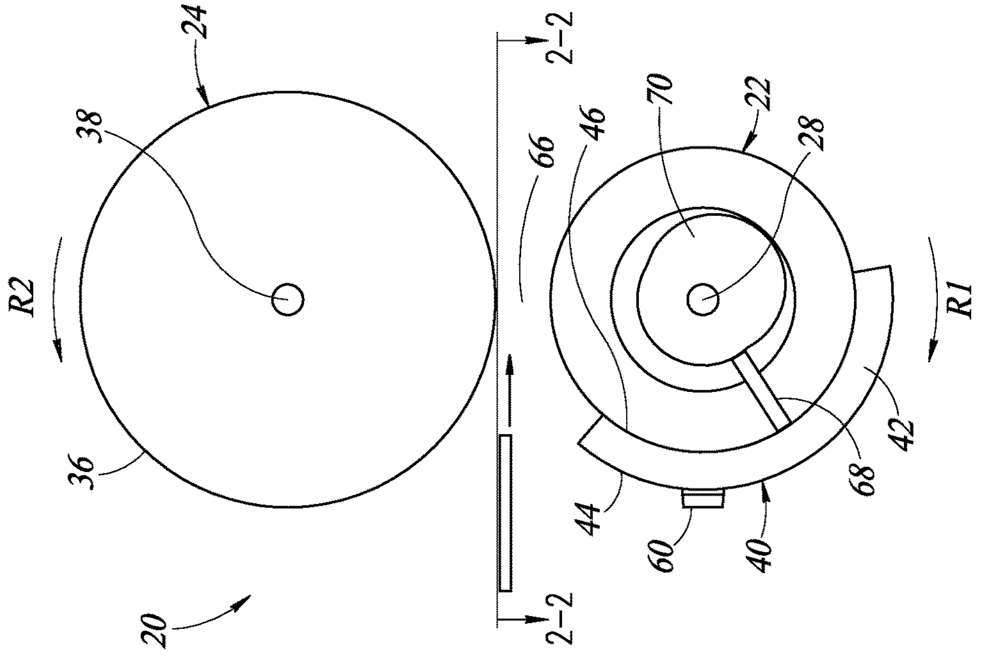
FIG. 1 is a side cross-sectional view of a rotary cutting system according to one embodiment, the system in a first orientation.

During operation of the rotary cutting system 20, a blank (e.g., a corrugated packaging blank 10) may be moved towards a nip 66 between the die drum 22 and the anvil drum 24, as shown in FIGS. 1 and 2. The die drum 22 may rotate about the axis of rotation 28 in the first rotational direction R1, while the anvil drum 24 rotates about the axis of rotation 38 in the second rotational direction R2. The die board 40 may be secured to the die drum 22 such that the die board 40 and the anvil drum 24 make rolling contact with the corrugated packaging blank 10 as the corrugated packaging blank 10 passes through the nip 66.

Figure 4:
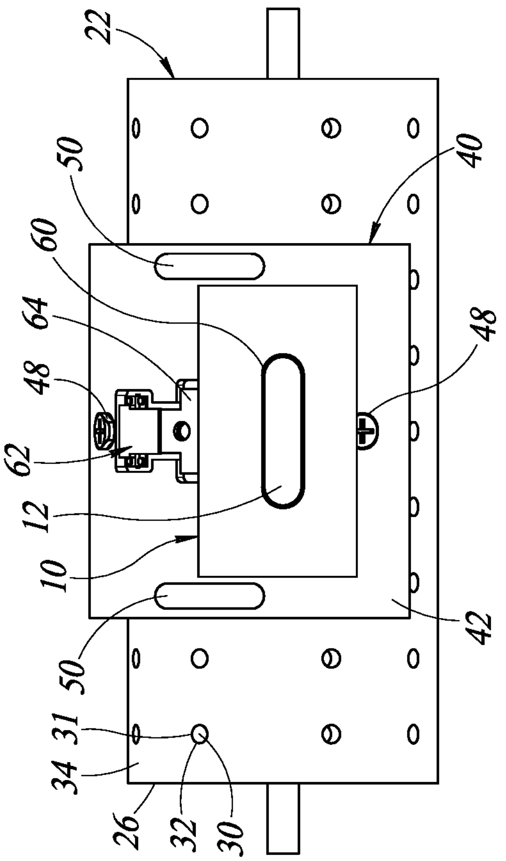
FIG. 4 is a top plan view of the rotary cutting system illustrated in FIG. 1, the system in the second orientation.
Figure 3:
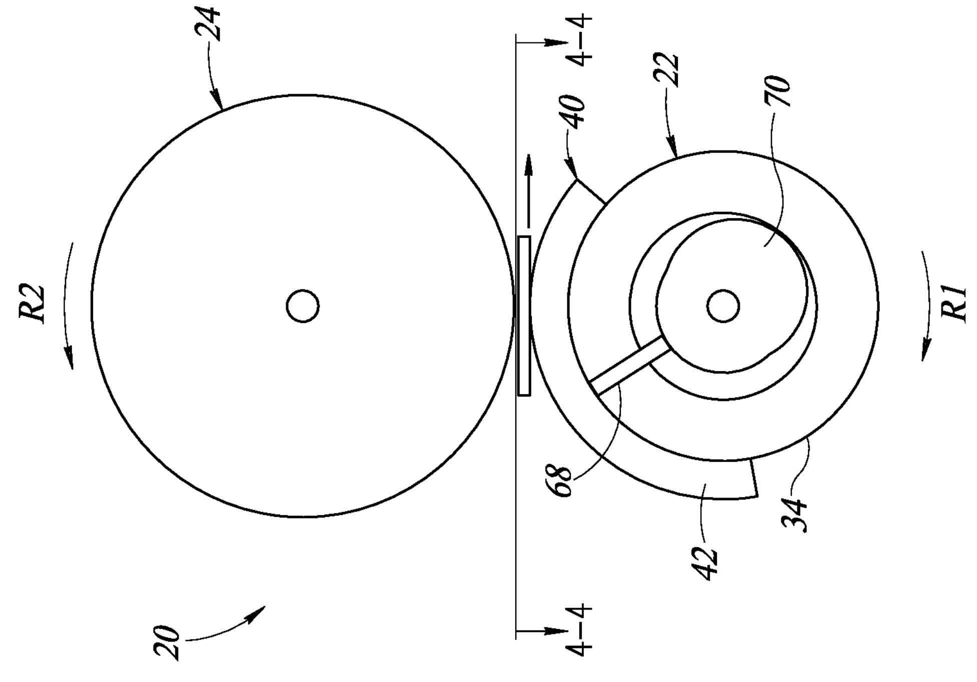
FIG. 3 is a side cross-sectional view of the rotary cutting system illustrated in FIG. 1, the system in a second orientation.

As the corrugated packaging blank 10 passes through the nip 66, the blade 60 may separate a portion 12 of the corrugated packaging blank 10 from a remainder 14 of the corrugated packaging blank 10 as shown in FIGS. 3 and 4. According to one embodiment, the portion 12 may have the same enclosed shape that is formed by the blade 60.

As the corrugated packaging blank 10 exits the nip 66, the portion 12 may remain trapped within the interior volume of the blade 60 while the remainder 14 leaves the rotary cutting system 20. The rotary cutting system 20 may include a plunger 68 and an actuator 70 each positioned within the die drum 22. As shown, the plunger 68 may be positioned within one of the plurality of recesses 30. The recess 30 within which the plunger 68 is positioned may be one of the anchor points 31 (i.e., such that all of the plurality of recesses 30 are identical and functional as anchor points to secure a component to the die drum 22). Additionally, the plurality of recesses 30 may be different sizes, shapes, etc. For example, the recesses within which the plunger 68 is positioned may be smooth bored (i.e., devoid of threads).

Figure 5:
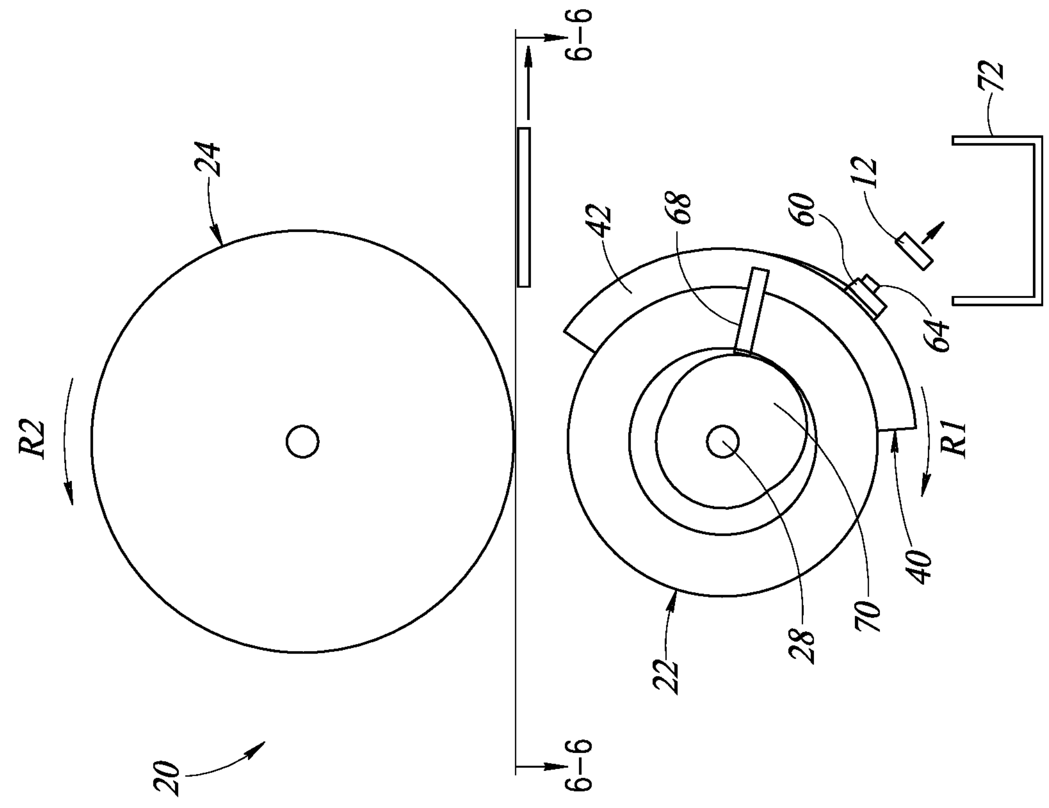
FIG. 5 is a side cross-sectional view of the rotary cutting system illustrated in FIG. 1, the system in a third orientation.
Figure 6:
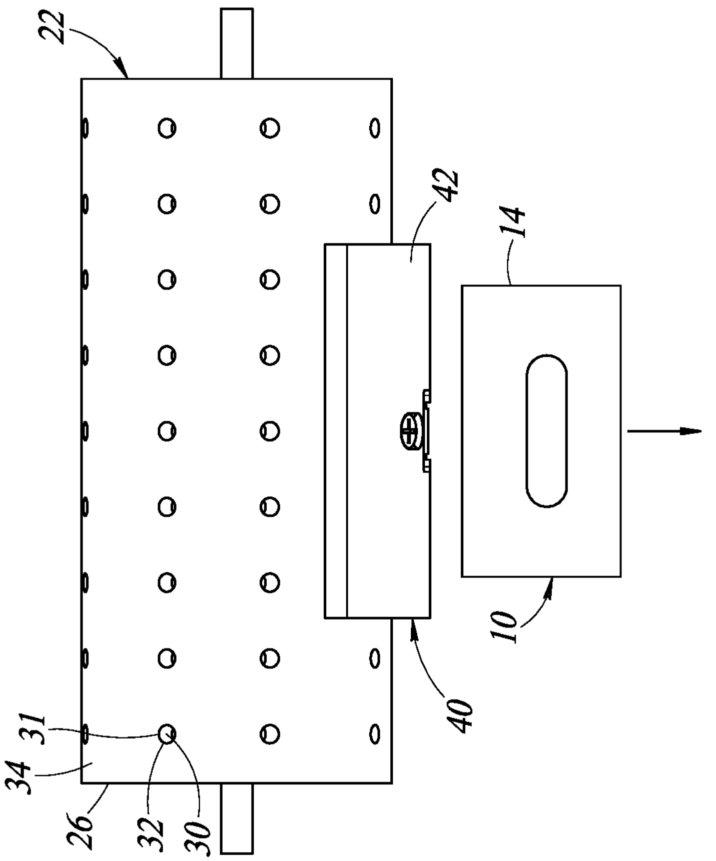
FIG. 6 is a top plan view of the rotary cutting system illustrated in FIG. 1, the system in the third orientation.
Figure 7:
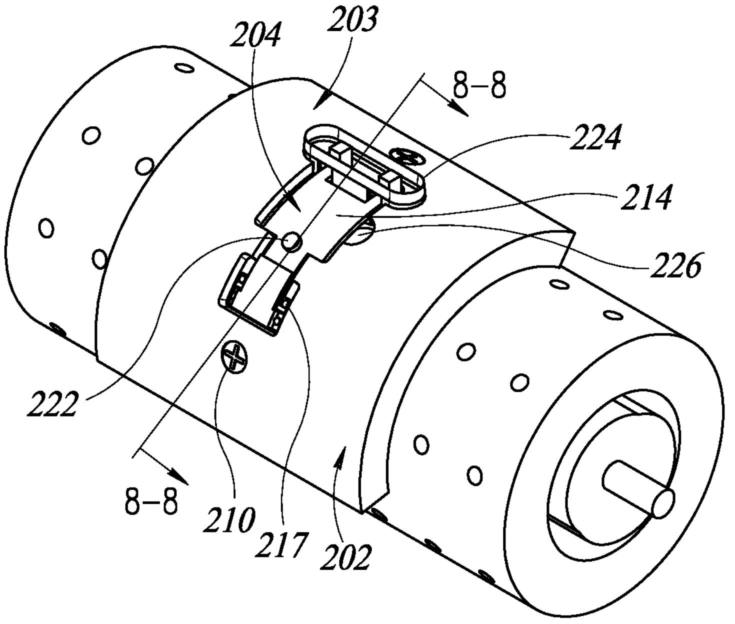
FIG. 7 (PRIOR ART)
FIG. 7 is a top plan view of a known die board, according to one embodiment.

The plunger 68 and the actuator 70 may be arranged such that when the die board 40 and the plunger 68 are within a specific portion of a full rotation of the die drum 22 about the axis of rotation 28, the actuator 70 translates the plunger 68 radially (away from the axis of rotation 28) into contact with the scrap ejector 62, thereby causing the lever 64 to rotate about an axis of rotation of the scrap ejector 62 relative to the substrate 42. This rotation of the lever 64 pushes the trapped portion 12 of the corrugated packaging blank 10 out of the interior volume of the blade 60 (e.g., toward a scrap collector 72) as shown in FIGS. 5 and 6.

As shown, the actuator 70 may include a cam positioned such that the plunger 68 rides along the cam and remains within the die drum 22 until reaching the specific portion of the rotation of the die drum 22 (e.g., between 90° and 180° from the nip 66). Upon reaching the specific portion of the rotation of the die drum 22, the shape and/or position of the cam causes the plunger 68 to translate away from the axis of rotation 28 and into contact with the lever 64. The cam may be stationary during operation of the rotary cutting system 20, such that the die drum 22 rotates relative to the cam.

Referring to FIGS. 7 to 10, a known rotatory cutting system 200 is shown that involves a complicated assembly process prior to operation. As shown, the rotary cutting system 200 includes a known die board 202, which includes a known substrate 203 and a known scrap ejector 204. To assemble the rotary cutting system 200, the die board 202 is secured to a die drum 206 via a plurality of fasteners 208 (e.g., externally threaded members such as a bolt), each inserted through a fastener receiving hole 210 of the die board 202 and into a fastener receiving hole (e.g., an internally threaded hole) of the die drum 206.

Figure 8:
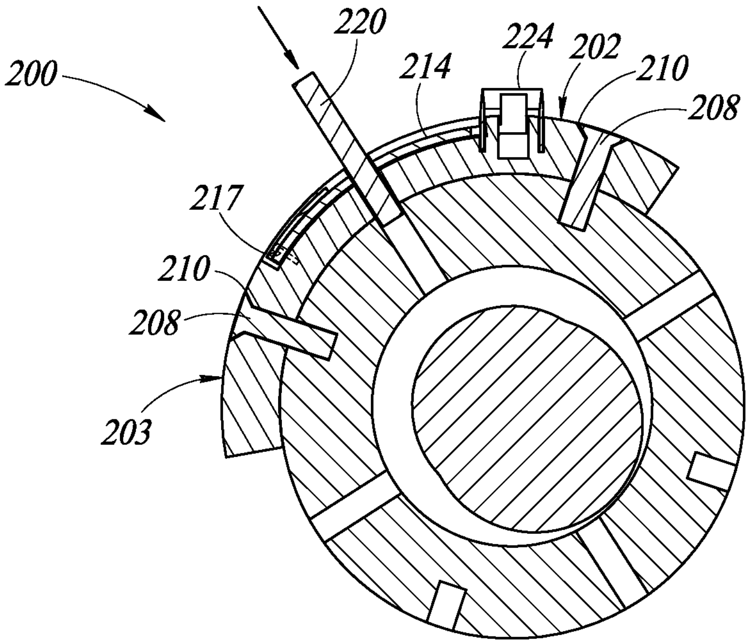
FIG. 8 (PRIOR ART)
FIG. 8 is a side cross-sectional view of the known die board illustrated in FIG. 7, the die board mounted to a die drum and the die drum at a first stage of assembly.

Securing the die board 202 to the die drum 206 aligns a plunger hole 212 within a lever 214 of the scrap ejector 204 with a through hole 216 of the substrate 203 and with a plunger receiving hole 218 of the die drum 206. A plunger 220 is inserted through the plunger hole 212, through the through hole 216, and into the plunger receiving hole 218, as shown in FIG. 8. Then the plunger hole 212 of the lever 214 is blocked (e.g., with a clip 222 as described below) so as to provide a surface for the plunger 220 to strike upon radial translation away from an axis of rotation of the die drum 206. The plunger 220 striking the lever 214 rotates the lever 214 which then pushes scrap out of the interior volume of a blade 224 carried by the substrate 203.

Figure 9:
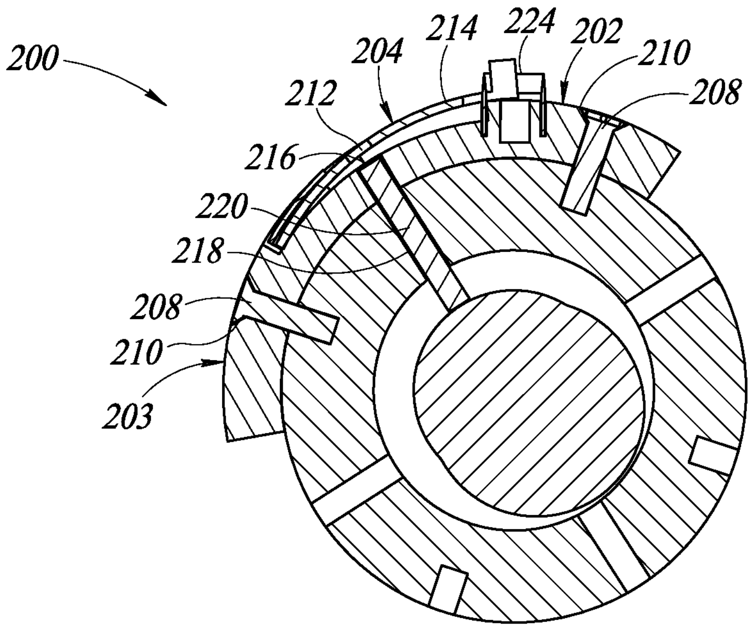
FIG. 9 (PRIOR ART)
FIG. 9 is a side cross-sectional view of the known die board mounted to the die drum illustrated in FIG. 8, the die board at a second stage of assembly.

The scrap ejector 204 includes the clip 222, which is removable/attachable to the lever 214 to block the plunger hole 212 after the plunger 220 is positioned within the die drum 206. To attach the clip 222, the lever 214 is rotated away from the die board 202, as shown in FIG. 9. To facilitate this rotation of the lever 214, a finger recess 226 may be provided in the substrate 203 at a location adjacent to the lever 214. This finger recess 226 may collect scrap or other debris during operation of the rotary cutting system 200, thus resulting in more frequent maintenance to prevent jamming or other problems resulting from the scrap/debris build up.

Figure 10:
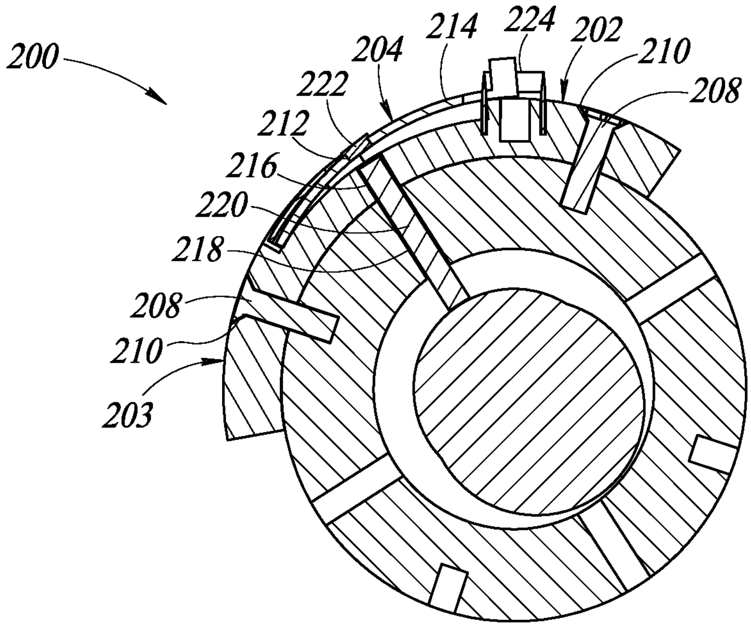
FIG. 10 (PRIOR ART)
FIG. 10 is a side cross-sectional view of the known die board mounted to the die drum illustrated in FIG. 8, the die board at a third stage of assembly.
Figure 11:
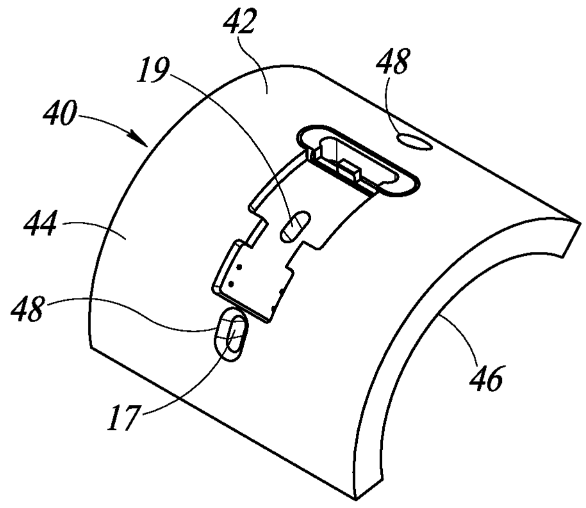
FIG. 11 is a top plan view of a substrate of a die board, according to one embodiment.

An operator of the rotary cutting system 200 may place their finger within the finger recess 226 to apply a force to the underside of the lever 214, causing the lever 214 to rotate up and away from the substrate 203 and at least partially out of a cutout that receives the lever 214. Once the lever 214 is rotated away from the die board 202, the clip 222 may be attached to the lever 214 and arranged such that at least a portion of the plunger hole 212 is blocked by the clip 222, as shown in FIG. 10. The clip 222 is small and includes a biasing force that is overcome during attachment of the clip 222 to the lever 214. The size and biasing force of the clip 222 result in the clips 222 being dropped or lost during attachment, which increases assembly time for the rotary cutting system 200.

Although only one of the scrap ejectors 204 is shown, some die boards 202 include many of the scrap ejectors 204. Additionally, the rotary cutting system 200 may include more than one die board 202, each having a respective plurality of the scrap ejectors 204. As the number of scrap ejectors 204 increases, so does the assembly time for the rotary cutting system 200. Additionally, some of the scrap ejectors 204 may be angularly (i.e., circumferentially) offset from one another along the die board 202. Because the plungers are only held in place by gravity prior to attachment of the clip 222, each plunger 220 is inserted while the plunger hole 212 faces "up" (i.e., away from the direction of gravity). After all of the "upward" facing plungers 220 are inserted and all of the "upward" facing plunger holes 212 are blocked with respective ones of the clips 222, the die board 202 and die drum 206 to which it is secured may be rotated until the next plunger hole(s) 212 are facing "up."

Referring to FIGS. 11 to 14, the die board 40 of the pending disclosure may include elements that reduce assembly time of the rotary cutting system 20. According to one embodiment, at least some of the fastener receiving holes 48 of the die board 40 are oblong (e.g., squares or circles elongated in one dimension, slots, etc.). As shown, the oblong fastener receiving holes 17 may be elongated in the first rotational direction R1. Similarly, the die board 40 may include one or more plunger receiving holes 19 that are also oblong (e.g., elongated in the first rotational direction R1). The oblong fastener receiving holes 17 and the oblong plunger receiving holes 19 enable a method of assembling a rotary cutting system (e.g., the rotary cutting system 20) as described below.

According to one embodiment, a method of assembling a rotary cutting system (e.g., the rotary cutting system 20) includes aligning one of the through holes 48 (e.g., the oblong fastener receiving hole 17) of the die board 40 with one of the recesses 30 (e.g. a first anchor point 31*a*) of the die drum 22 with respect to a radial direction extending perpendicularly away from the axis of rotation 28 of the die drum 22 (i.e., such that a radial ray 52 extending away from the axis of rotation 28 passes through both the oblong fastener receiving hole 17 and the aligned recess 30. The method may further include aligning the plunger hole 212 of the lever 214 with another of the recesses 30 (e.g., a first recess 30*a*) of the die drum 22. The method may further include aligning another of the through holes 48 (e.g., the plunger receiving hole 19) of the die board 40 with the first recess 30*a* of the die drum 22. As described above, the first anchor point 31*a* and the first recess 30*a* may be identical, such that in another configuration (i.e., with other die boards 40 secured to the die drum 22) the first anchor point 31*a* may receive a plunger (e.g., the plunger 220) and the first recess 30*a* may receive a fastener (e.g., the fastener 208).

As shown, the plunger receiving hole 19 may be located within a cutout of the die drum 22 that receives a scrap ejector (e.g., the scrap ejector 204). Thus, according to one embodiment, the plunger receiving hole 19 may have a height (measured along a radial ray extending perpendicular from the axis of rotation 28 and through the plunger receiving hole 19) that is less than a height of the oblong fastener receiving hole 17 (measured along another radial ray extending perpendicular from the axis of rotation 28 and through the oblong fastener receiving hole 17).

Figure 12:
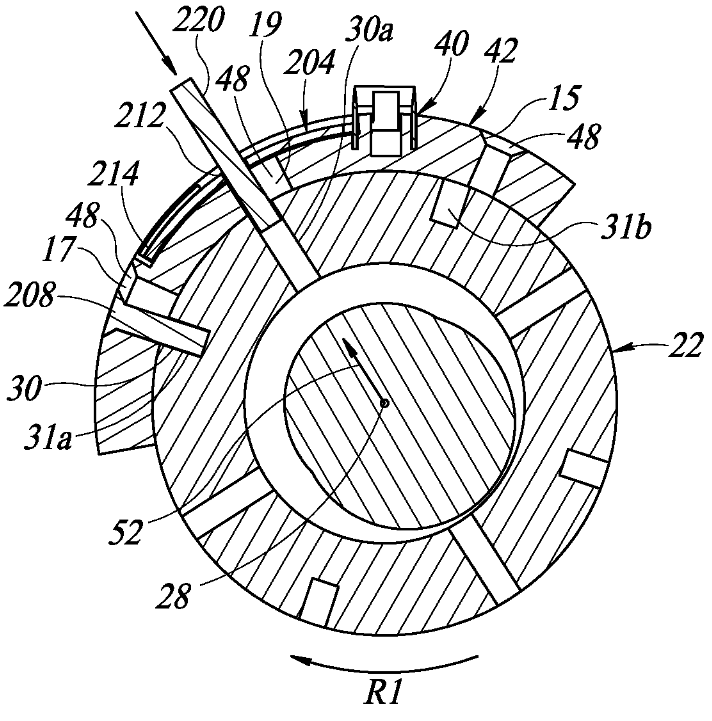
FIG. 12 is a side cross-sectional view of a die board according to one embodiment, the die board including the substrate illustrated in FIG. 11 and mounted to a die drum during a first stage of assembly.

The method may further include inserting a portion of a fastener (e.g., the fastener 208) through the oblong fastener receiving hole 17 and into the first anchor point 31*a* such that the fastener 208 is secured relative to the die drum 22, as shown in FIG. 12. According to one embodiment, the inserted fastener may be a first fastener, and the method may further include inserting additional fasteners (e.g., second, third, fourth, fifth, etc.) into additional corresponding anchor points similarly to the first fastener as described. Thus, the die drum 22 may include a plurality of oblong fastener receiving holes 17 (e.g., aligned in a row) each aligned with a corresponding anchor point 31.

The method may include inserting an actuator (e.g., the plunger 220) through the plunger receiving hole 19 and into the first recess 30*a*, as shown in FIG. 12.

Figure 13:
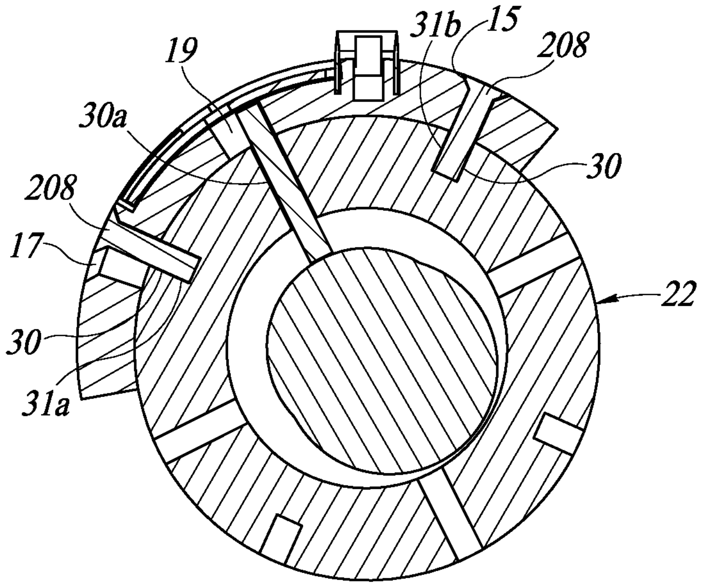
FIG. 13 is a side cross-sectional view of the die board illustrated in FIG. 12, the die board mounted to the die drum during a second stage of assembly.
Figure 14:
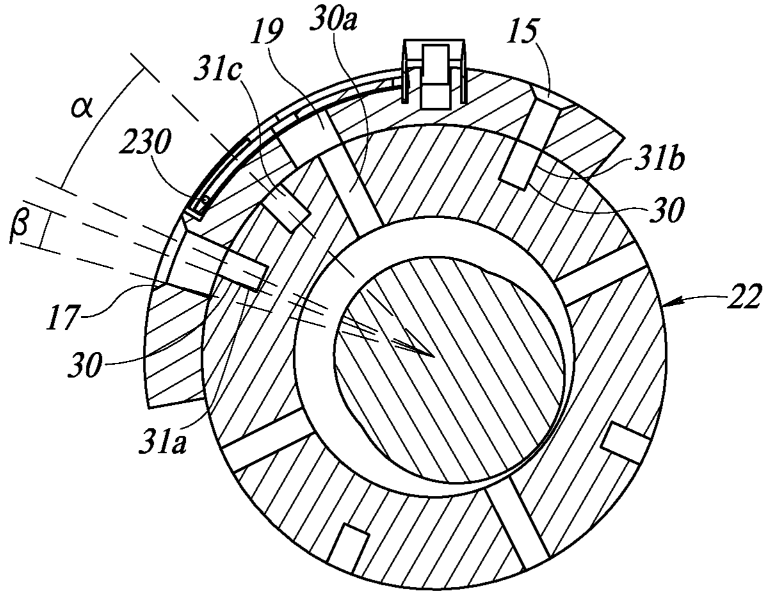
FIG. 14 is another side cross-sectional view of the die board illustrated in FIG. 12.

The method may further include rotating both the substrate 42 and the scrap ejector 204, carried by the substrate 42, relative to the die drum 22 and the plunger 220, positioned within the first recess 30*a*, until the plunger hole 212 of the scrap ejector 204 is out of alignment with the plunger 220 such that the plunger's 220 exit from the first recess 30*a* is blocked by the scrap ejector 204. According to one embodiment, the plunger 220 exits from the first recess 30*a* along a radial direction that extends perpendicular from the axis of rotation 28. As shown in FIG. 13, the exit of the plunger 220 may be blocked by the lever 214 (e.g., a portion of the lever 214 through which the plunger hole 212 extends).

The die board 40 may include additional scrap ejectors (e.g., a second scrap ejector), which may be aligned with the die drum 22 similarly to the scrap ejector 204 as described above. According to one embodiment, the method may include aligning a through hole of a second scrap ejector that is carried by the die board 40 with one of the plurality of recesses 30 (e.g., one of the anchor points 31) of the die drum 22. A second plunger 220 may be inserted through the through hole of the second scrap ejector, through a through hole of the die board 40, and into a corresponding recess 30 of the die drum 22, similarly to the first plunger 220 as described above. Rotating the die board 40 relative to the die drum 22 may include rotating the second scrap ejector relative to the second plunger until the through hole of the second scrap ejector is out of alignment with the second plunger such that second plunger's exit from the recess 30 is blocked by the second scrap ejector.

The oblong shape of the oblong fastener receiving hole(s) 17 may be elongate along a central axis (e.g., that extends along the first rotational direction R1), and the oblong fastener receiving hole 17 may be symmetrical about the central axis. Rotation of the die board 40 relative to the die drum 22 and the plunger 220 may include moving the die board 40 relative to the fastener 208 such that the fastener 208 follows a path that is coincident with the central axis of the oblong fastener receiving hole 17.

After rotating the die board 40 relative to the die drum 22 until the plunger hole 212 of the scrap ejector 204 is out of alignment with the plunger 220, the die board 40 may be secured relative to the die drum 22 such that relative movement of the die board 40 and the die drum 22 is blocked with respect to all degrees of freedom. According to one embodiment, the fastener 208 may be further tightened within the oblong fastener receiving hole 17 to secure the die board 40 relative to the die drum 22. Additional fasteners (e.g., similar to the fastener 208) may be inserted through additional respective through holes 48 of the die board 40 and into respective recesses 30 (e.g., anchor points 31) of the die drum 22 to secure the die board 40 relative to the die drum 22.

As shown, a fastener (e.g., the fastener 208) may be inserted through a fastener receiving hole 15 of the die board 40 and into a third one of the plurality of recesses 30 (e.g., a second anchor point 31*b*) of the die drum 22. According to one embodiment, the fastener receiving hole 15 may have a different shape from that of the oblong fastener receiving hole 17. For example, the fastener receiving hole 15 may have a shape that corresponds to the fastener 208 (e.g., circular). As shown, the fastener receiving hole 15 may not have an oblong shape. Prior to rotation of the die board 40 relative to the die drum 22, the fastener receiving hole 15 and the second anchor point 31*b* may be unaligned (as shown in FIG. 12), and are aligned after rotation of the die board 40 relative to the die drum 22 (as shown in FIG. 13).

The method may include rotating the die drum 22 in the first rotational direction R1 about the axis of rotation 28 after the die board 40 is secured to the die drum 22 (e.g., as described above). According to one embodiment, adjacent ones of the plurality of recesses 30 of the die drum 22 (with respect to the first rotational direction R1) may be distanced from one another by an angle α. As shown, the angle α may be measured from a center of the first anchor point 31*a* to a center of an adjacent one of the plurality of recesses (e.g., a third anchor point 31*c*) along the first rotational direction R1. The oblong fastener receiving hole 17 of the die board 40 may have an arc length β (e.g., measured along the first rotational direction R1). The angle α of the die drum 22 may be greater than the arc length β. Accordingly, the method may include rotating the die board 40 relative to the die drum 22 by an angle that is less than the angle α (e.g., up to the arc length β).

The scrap ejector 204 may be carried by the substrate 42 such that the lever 214 is rotatable relative to the die board 40 about an axis of rotation 230. As shown, the axis of rotation 230 may be parallel to and radially distanced from the axis of rotation 28 of the die drum 22. The method may include securing the scrap ejector 204 to the die board 40 such that the lever 214 is rotatable relative to the die board about the axis of rotation 230.

Figure 15:
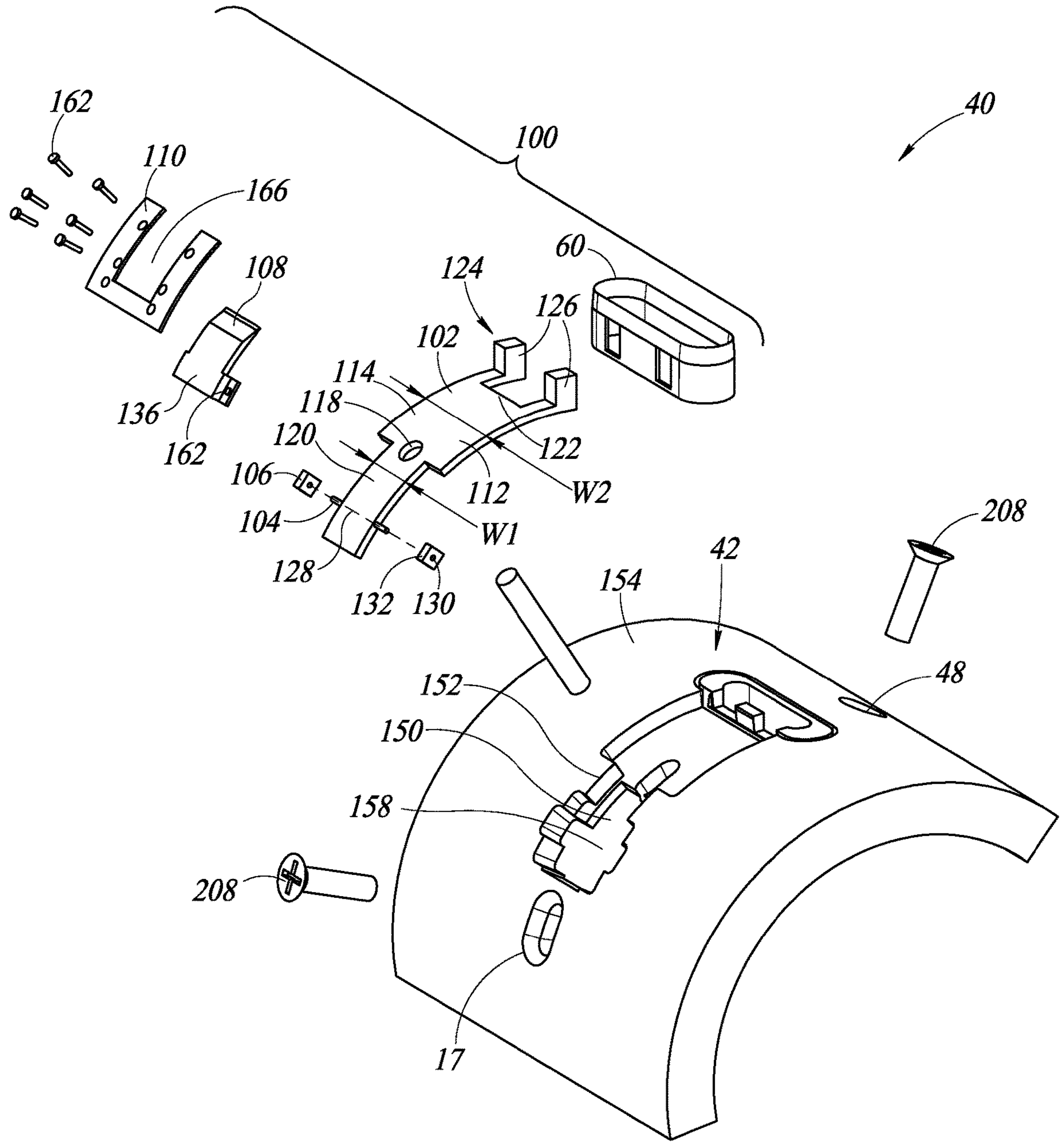
FIG. 15 is an exploded isometric view of a die board, according to one embodiment.
Figure 16:
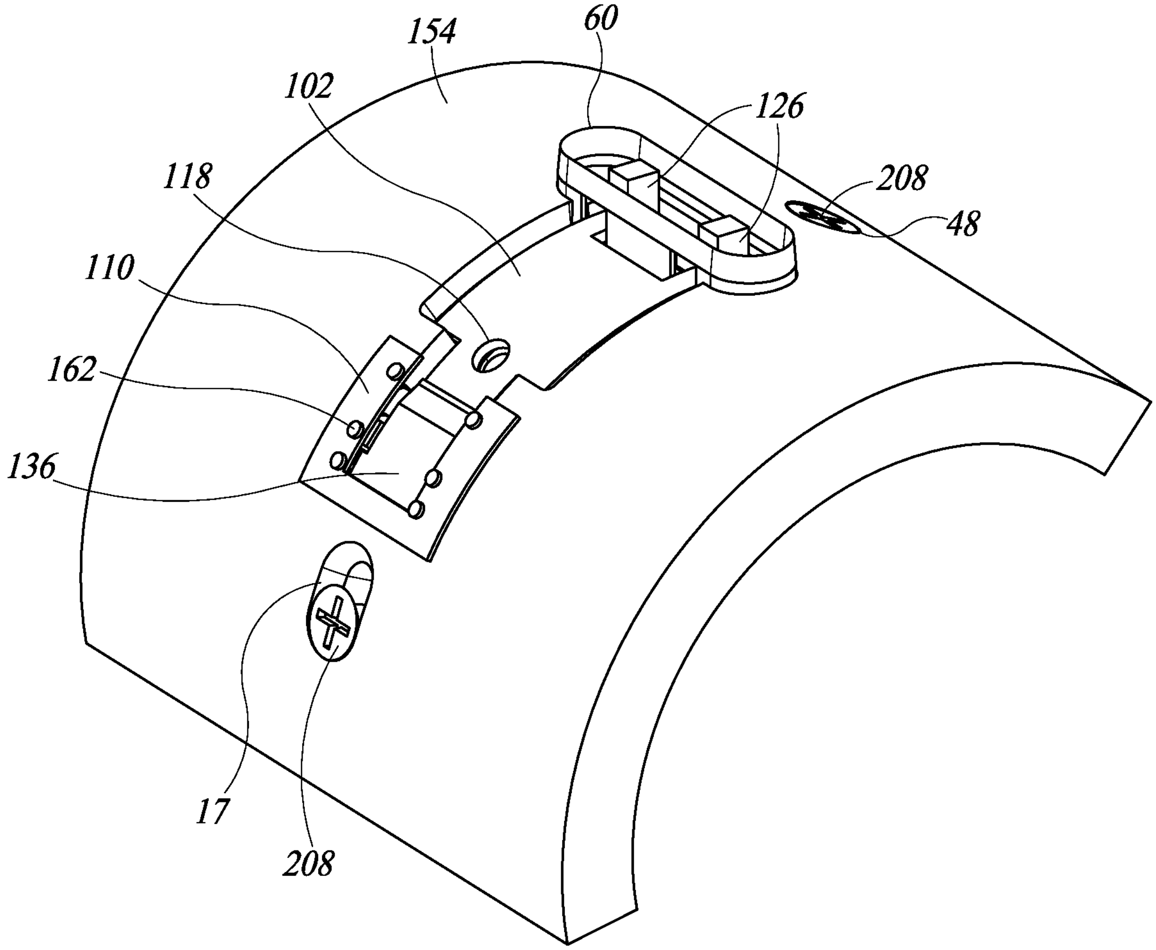
FIG. 16 is an isometric view of the die board illustrated in FIG. 15, in an assembled configuration, according to one embodiment.
Figure 17:
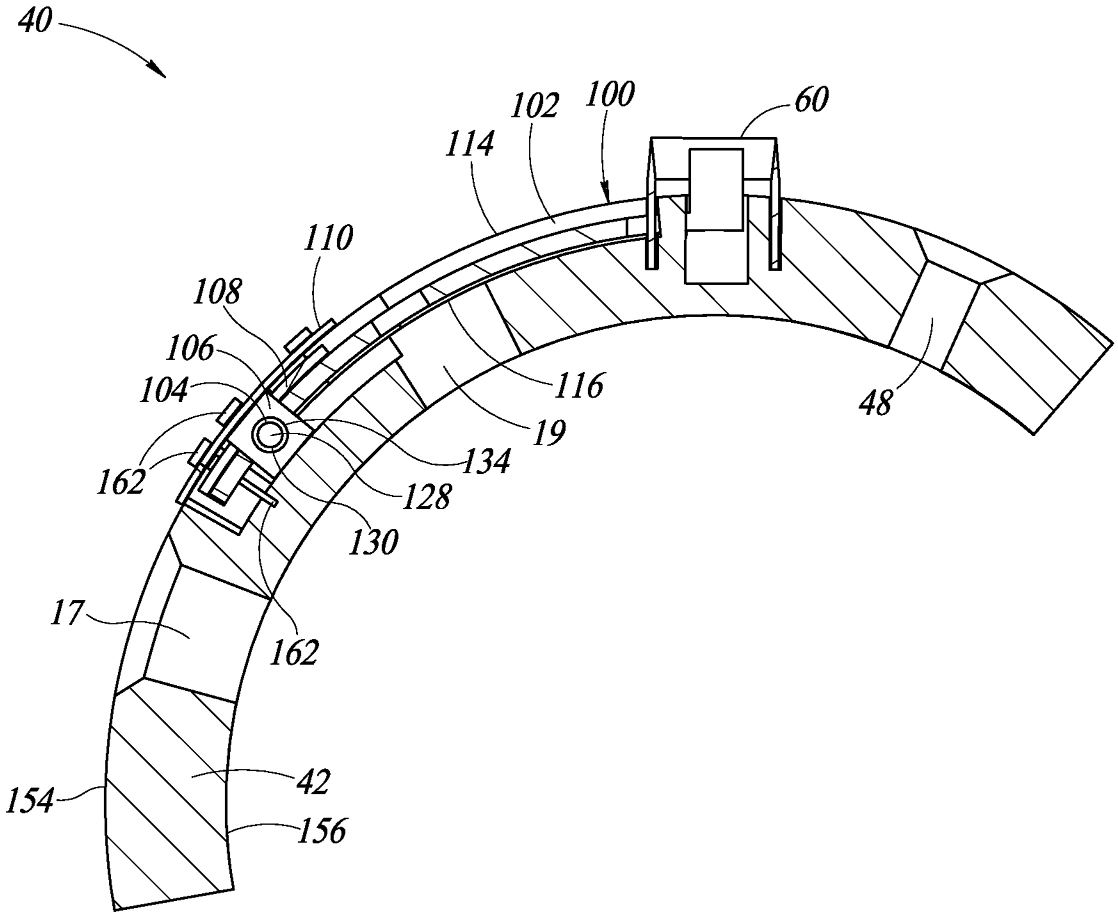
FIG. 17 is a side cross-sectional view of the die board illustrated in FIG. 16.

As described above, the rotary cutting system 20 may include the known scrap ejector 204 secured to the die board 40 such that the clips 222 are not needed to block the plunger hole 212. Referring to FIGS. 15 to 17, the rotary cutting system 20 (e.g., the die board 40) may include a scrap ejector 100. The scrap ejector 100 may include a lever 102, a shaft 104, one or more bearing blocks 106, a biasing member 108, and a bracket 110.

The lever 102 may be similar to the lever 214 as described above. As shown, the lever 102 may include a first portion 112 that is substantially planar. The first portion 112 may be entirely planar (e.g., with a first major face 114 and a second major face 116 that are both flat), or may have a curvature (e.g., with the first major face 114 being convex and the second major face 116 being concave). The curvature of the first portion 112 may match that of a substrate (e.g., the substrate 42) to which the scrap ejector 100 is secured. The scrap ejector 100 (e.g., the lever 102) may include a plunger receiving hole 118, formed by the first portion 112, such that the plunger receiving hole 118 extends through both the first major face 114 and the second major face 116.

The shaft 104 may be secured (e.g., welded) to the lever 102. As shown, the shaft 104 may be secured to one of the major faces (e.g., the first major face 114 or the second major face 116), at a location proximate a first end 120 of the lever 102. The first end 120 may have a width W1 measured across the first major face 114 that is greater than a width W2 of a second end 122 of the lever 102. The lever 102 may include a second portion 124 that extends from the second end 122 of the lever 102. The second portion 124 may extend out of plane with respect to the first major face 114 of the lever 102. As shown, the second portion 124 may include one or more extensions 126.

The shaft 104 may be received within the one or more bearing blocks 106 such that the shaft 104, and the attached lever 102, is rotatable relative to the one or more bearing blocks 106 about an axis of rotation 128. As shown, the shaft 104 may have a circular cross-sectional shape and the axis of rotation 128 may be the center of the circular cross-sectional shape. The one or more bearing blocks 106 may include a recess 130 (e.g., a through hole) that receives a portion of the shaft 104. The recess 130 may have a shape that corresponds to the shaft 104 such that the shaft 104 is rotatable within the recess 130.

The bearing block 106 may be monolithic, and may be formed from plastic (e.g., nylon). According to one embodiment, the bearing block 106 may include an outer portion 132 made from a first material, surrounding an inner portion 134 made from a second material, with the inner portion 134 forming the recess 130. According to one embodiment, the outer portion 132 may be made from a softer material (e.g., a plastic such as nylon) and the inner portion 134 may be made from a harder material (e.g., a metal such as brass).

The shaft 104 may be positioned within the bearing block 106 so as to form a hinge point, which may (as shown) be fully recessed into the substrate 42. Alternatively, the hinge point may be positioned such that the hinge point is above the first major face 114. The bearing block 106 may be indirectly secured relative to the substrate 42 (e.g., via the bracket 110), or may be directly fastened to the substrate 42 (e.g., via one or more fasteners).

The biasing member 108 may be in the form of a spring clip 136. The spring clip 136 may be positioned relative to the lever 102 such that a portion of the spring clip 136 extends over the first end 120 of the lever 102 and exerts a biasing force "down" on the first major face 114 toward the second major face 116. Alternatively, the biasing member 108 may be a spring positioned below the lever 102 such that the biasing member 108 exerts a biasing force "up" on the second major face 116. The spring may be positioned on an opposite side of the axis of rotation 128 from the extensions 126.

The bracket 110 may be entirely planar or have a curvature (similarly to the description of the first portion 112 of the lever provided above). The bracket 110 may include one or more fastener receiving holes 140 that extend through the bracket 110.

A method of assembling a die board (e.g., the die board 40) includes positioning the lever 102 within a cutout 150 of the substrate 42. The cutout 150 may include an opening 152 in a convex surface 154 of the substrate, and the cutout 150 may extend towards a concave surface 156 of the substrate 42 that is opposite the convex surface 154. The method may include securing the lever 102 within the cutout 150 such that the lever 102 is rotatable relative to the substrate 42 about the axis of rotation 128, and such that the axis of rotation 128 is positioned within the cutout 150 and between the convex surface 154 and the concave surface 156.

The method may include positioning the shaft 104 that is secured to the lever 102 within the recess 130 of one or more of the bearing blocks 106 such that the shaft 104 and the lever 102 are rotatable relative to the one or more bearing blocks 106 about the axis of rotation 128. According to one embodiment, securing the lever 102 within the cutout 150 includes securing the one or more bearing blocks 106 within the cutout 150 such that the shaft 104 and the recesses 130 are positioned within the cutout 150.

According to one embodiment, the method includes securing the spring clip 136 to the die board 40 such that the spring clip 136 exerts a biasing force on the lever 102 that biases the lever 102 toward the die board 40. Securing the spring clip 136 to the die board 40 may include inserting one or more fasteners 162 (e.g., screws) through respective holes of the spring clip 136 and into a surface 158 of the die board 40. As shown, the surface 158 may be a base surface 160 that partially forms the cutout 150, and that is positioned between the convex surface 154 and the concave surface 156.

The bracket 110 may be used to secure the lever 102 within the cutout 150. According to one embodiment, the method includes securing the bracket 110 to the die board 40 such that the bracket 110 blocks a portion of the opening 152. As shown, the portion of the opening being blocked by the bracket 110 is aligned with the one or more bearing blocks 106 such that movement of the one or more bearing blocks 106 out of the cutout 150 is prevented. The bracket 110 may be secured to the die board 40 by inserting one or more fasteners 162 through one or more respective through holes 164 of the bracket 110. The one or more fasteners 162 may be inserted through the convex surface 154.

The fasteners 162 may be of different sizes. For example, the fasteners 162 used to secure the spring clip 136 within the cutout 150 may be smaller (e.g., shorter, smaller diameter) than the fasteners 162 used to secure the bracket 110 to the convex surface 154.

Inserting the one or more fasteners 162 through the convex surface 154 may result in a more durable connection of the scrap ejector 100 to the die board 40. The die board 40 may have a thickness of less than 1 inch (e.g., 0.5 in., ⅝ in.), thus inserting the one or more fasteners 162 into a surface of the die board 40 within the cutout 150 may result in a weaker connection due to the limited amount of the die board 40 available for the one or more fasteners 162 to anchor within.

Known scrap ejectors (such as the known scrap ejector 204 shown in FIGS. 7 to 10) include fasteners inserted through a surface within the cutout that receives the lever 214. Due to the rotation of the die drum 206 and attached die board 202 in addition to the rotation of the lever 214 relative to the substrate of the die board 202 during scrap ejection, the connection of the lever 214 to the substrate may have "slop," resulting in vibration within the system. This vibration can cause early wear on components of the die board 202. Specifically, the point at which fasteners 217 tap into the substrate are susceptible to stripping.

These smaller screws may be more reliable when the rotary cutting system 20 is operating with corrugated packaging blanks 10 of a smaller gauge/thickness. However, as the thickness of the corrugated packaging blanks 10 increases the wear and tear on the rotary cutting system 20 also increases. Thus, a more secure connection between scrap ejectors and their substrates as discussed herein may result in more robust die boards that are less susceptible to failure at the connection point(s) between the scrap ejector(s) and substrate.

The bracket 110 may have a shape that corresponds to the first end 120 of the lever 102. As shown, the bracket 110 may have a "C" shape with a central recess 166 that provides a path for the first end 120 of the lever 102 and the spring clip 136 to rotate through during operation of the rotary cutting system 20. When the lever 102 rotates away from the die board 40, about the axis of rotation 128, portions of the first end 120 and the spring clip 136 may enter the central recess 166.

The above description of illustrated embodiments, including what is described in the Abstract, is not intended to be exhaustive or to limit the embodiments to the precise forms disclosed. Although specific embodiments of and examples are described herein for illustrative purposes, various equivalent modifications can be made without departing from the spirit and scope of the disclosure, as will be recognized by those skilled in the relevant art. The various embodiments described above can be combined to provide further embodiments.

Many of the methods described herein can be performed with variations. For example, many of the methods may include additional acts, omit some acts, and/or perform acts in a different order than as illustrated or described.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method of assembling a rotary cutting system, the method comprising:

aligning a first through hole of a die board with a first anchor point of a die drum, wherein the die drum is rotatable about an axis of rotation in a first rotational direction, and the first through hole has an oblong shape that is elongate along the first rotational direction;

aligning a through hole of a scrap ejector supported by the die board with a recess of the die drum;

aligning a second through hole of the die board with the recess of the die drum;

inserting a portion of a fastener through the first through hole and into the anchor point such that the fastener is secured relative to the die drum;

inserting a plunger through the through hole of the scrap ejector, through the second through hole of the die board, and into the recess; and rotating the die board and the scrap ejector relative to the die drum and the plunger until the through hole of the scrap ejector is out of alignment with the plunger such that the plunger's exit from the recess is blocked by the scrap ejector, wherein the second through hole of the die board has an oblong shape that is elongate along the first rotational direction.

2. The method of claim 1 wherein the scrap ejector is a first scrap ejector, the recess is a first recess, and the plunger is a first plunger, the method further comprising:

aligning a through hole of a second scrap ejector supported by the die board with a second recess of the die drum;

aligning a third through hole of the die board with the second recess of the die drum; and inserting a second plunger through the through hole of the second scrap ejector, through the third through hole of the die board, and into the second recess, wherein rotating the die board and the scrap ejector relative to the die drum and the plunger includes rotating the through hole of the second scrap ejector out of alignment with the second plunger such that second plunger's exit from the second recess is blocked by the second scrap ejector.

3. The method of claim 1 wherein the oblong shape of the first through hole is elongate along a central axis, and the oblong shape of the first through hole is symmetrical about the central axis, the method further comprising:

during rotation of the die board and the scrap ejector relative to the die drum and the plunger, moving the die board relative to the fastener such that the fastener follows a path that is coincident with the central axis.

4. The method of claim 3, further comprising:

securing the die board and the scrap ejector relative to the die drum and the plunger when the through hole of the scrap ejector is out of alignment with the plunger.

5. The method of claim 4, further comprising:

after securing the die board and the scrap ejector relative to the die drum and the plunger, rotating the die drum about the axis of rotation in the first rotational direction.

6. The method of claim 5 wherein the die drum includes an adjacent anchor point that is adjacent to the first anchor point with respect to the first rotational direction, the adjacent anchor point is distanced from the first anchor point by a first length measured along the first rotational direction, the oblong shape of the first through hole has a second length measured along the central axis in the first rotational direction, and the first length is greater than the second length.

7. The method of claim 5 wherein the axis of rotation is a first axis of rotation, further comprising:

securing the scrap ejector to the die board such that the scrap ejector is rotatable relative to the die board about a second axis of rotation.

8. The method of claim 7 wherein the first axis of rotation is parallel to the second axis of rotation.

9. The method of claim 1 wherein the fastener is a first fastener, the method further comprising:

prior to rotating the die board and the scrap ejector, aligning a third through hole of the die board with a second anchor point of the die drum, wherein the third through hole has an oblong shape that is elongate along the first rotational direction; and inserting a portion of a second fastener through the third through hole and into the second anchor point such that the second fastener is secured relative to the die drum.

10. The method of claim 1 wherein the first anchor point and the recess are identical in size and shape.

11. A method of assembling a rotary cutting system, the method comprising:

aligning a first through hole of a die board with a first anchor point of a die drum, wherein the die drum is rotatable about an axis of rotation in a first rotational direction, and the first through hole has an oblong shape that is elongate along the first rotational direction;

aligning a through hole of a scrap ejector supported by the die board with a recess of the die drum;

aligning a second through hole of the die board with the recess of the die drum, wherein the second through hole of the die board has an oblong shape that is elongate along the first rotational direction;

inserting a portion of a first fastener through the first through hole and into the first anchor point such that the first fastener is secured relative to the die drum;

inserting a plunger through the through hole of the scrap ejector, through the second through hole of the die board, and into the recess;

rotating the die board and the scrap ejector relative to the die drum and the plunger until the through hole of the scrap ejector is out of alignment with the plunger such that the plunger's exit from the recess is blocked by the scrap ejector; and after rotating the die board inserting a second fastener through a third through hole of the die board and into a second anchor point of the die drum such that the second fastener is secured relative to the die drum, wherein the third through hole has a circular shape.

12. The method of claim 11 wherein the oblong shape of the first through hole is elongate along a central axis, and the oblong shape of the first through hole is symmetrical about the central axis, the method further comprising:

during rotation of the die board and the scrap ejector relative to the die drum and the plunger, moving the die board relative to the fastener such that the fastener follows a path that is coincident with the central axis.

13. The method of claim 12, further comprising:

securing the die board and the scrap ejector relative to the die drum and the plunger when the through hole of the scrap ejector is out of alignment with the plunger.

14. The method of claim 13, further comprising:

after securing the die board and the scrap ejector relative to the die drum and the plunger, rotating the die drum about the axis of rotation in the first rotational direction.

15. The method of claim 14 wherein the die drum includes an adjacent anchor point that is adjacent to the first anchor point with respect to the first rotational direction, the adjacent anchor point is distanced from the first anchor point by a first length measured along the first rotational direction, the oblong shape of the first through hole has a second length measured along the central axis in the first rotational direction, and the first length is greater than the second length.

16. A method of assembling a rotary cutting system, the method comprising:

aligning a first through hole of a die board with a first anchor point of a die drum, wherein the die drum is rotatable about an axis of rotation in a first rotational direction, and the first through hole has an oblong shape that is elongate along the first rotational direction;

aligning a through hole of a scrap ejector supported by the die board with a recess of the die drum;

aligning a second through hole of the die board with the recess of the die drum;

inserting a portion of a fastener through the first through hole and into the anchor point such that the fastener is secured relative to the die drum;

inserting a plunger through the through hole of the scrap ejector, through the second through hole of the die board, and into the recess;

rotating the die board and the scrap ejector relative to the die drum and the plunger until the through hole of the scrap ejector is out of alignment with the plunger such that the plunger's exit from the recess is blocked by the scrap ejector, wherein the die drum includes an adjacent anchor point that is adjacent to the first anchor point with respect to the first rotational direction, the adjacent anchor point is distanced from the first anchor point by a first length measured along the first rotational direction, the oblong shape has a second length measured along the central axis in the first rotational direction, and the first length is greater than the second length.

17. The method of claim 16 wherein the axis of rotation is a first axis of rotation, further comprising:

securing the scrap ejector to the die board such that the scrap ejector is rotatable relative to the die board about a second axis of rotation.

18. The method of claim 17 wherein the first axis of rotation is parallel to the second axis of rotation.

* * * * *